US010460047B1

(12) United States Patent
Bienkowski et al.

(10) Patent No.: US 10,460,047 B1
(45) Date of Patent: Oct. 29, 2019

(54) TENTATIVE MODEL COMPONENTS

(71) Applicant: The MathWorks, Inc., Natick, MA (US)

(72) Inventors: Joseph R. Bienkowski, Ashland, MA (US); Pieter J. Mosterman, Framingham, MA (US); Jay Ryan Torgerson, Hopkinton, MA (US)

(73) Assignee: The MathWorks, Inc., Natick, MA (US)

( * ) Notice: Subject to any disclaimer, the term of this patent is extended or adjusted under 35 U.S.C. 154(b) by 464 days.

(21) Appl. No.: 14/633,956

(22) Filed: Feb. 27, 2015

(51) Int. Cl.
*G06F 17/50* (2006.01)
*G06F 3/0484* (2013.01)

(52) U.S. Cl.
CPC ........ *G06F 17/5009* (2013.01); *G06F 3/0484* (2013.01)

(58) Field of Classification Search
CPC ........... G05B 2219/23283; G05B 2219/24034; G05B 2219/13061; G06F 11/3656; G06F 17/5009; G06F 3/0484
See application file for complete search history.

(56) References Cited

U.S. PATENT DOCUMENTS

| | | | | |
|---|---|---|---|---|
| 4,965,743 A * | 10/1990 | Malin | ................ | G05B 17/02 703/17 |
| 5,481,740 A * | 1/1996 | Kodosky | ................ | G06F 3/0481 345/440 |
| 5,481,741 A * | 1/1996 | McKaskle | ................ | G06F 3/0481 345/522 |
| 5,615,371 A * | 3/1997 | Iuchi | ................ | G06F 11/362 714/35 |
| 6,412,101 B1 * | 6/2002 | Chang | ................ | G06F 17/5022 716/104 |
| 6,412,106 B1 * | 6/2002 | Leask | ................ | G06F 11/3664 714/E11.217 |
| 7,302,675 B2 * | 11/2007 | Rogers | ................ | G06F 11/3664 714/E11.217 |

(Continued)

OTHER PUBLICATIONS

Tabachnik, Igal. "How to debug anything with Visual Studio and JetBrains dotPeek v1.2!." In Absentia [blog], Jul. 16, 2014 [retrieved on Jun. 12, 2017]. Retrieved from <http://hmemcpy.com/2014/07/how-to-debug-anything-with-visual-studio-and-jetbrains-dotpeek-v1-2/>.*

(Continued)

*Primary Examiner* — Rehana Perveen
*Assistant Examiner* — Alfred H B Wechselberger
(74) *Attorney, Agent, or Firm* — Young Basile Hanlon & MacFarlane, P.C.

(57) ABSTRACT

A method may include causing a model, including a set of core model elements and a set of diagnostic model elements, to be executed. The set of diagnostic model elements may be associated with a conditional trigger-point. The conditional trigger-point may be associated with a condition of the model for triggering the conditional trigger-point. The method may include determining that the condition of the model has been satisfied. The method may include causing the set of diagnostic model elements to be displayed via a user interface based on determining that the condition of the model has been satisfied. The set of diagnostic model elements may not have been displayed, during execution of the model, prior to determining that the condition of the model has been satisfied.

23 Claims, 12 Drawing Sheets

(56) References Cited

U.S. PATENT DOCUMENTS

| | | | | |
|---|---|---|---|---|
| 7,464,373 | B1* | 12/2008 | Yunt | G06F 8/10 717/125 |
| 7,496,895 | B1* | 2/2009 | Mosterman | G06F 11/3664 717/124 |
| 7,774,172 | B1* | 8/2010 | Yunt | G06F 8/34 703/2 |
| 7,941,299 | B1* | 5/2011 | Aldrich | G06F 8/34 703/1 |
| 8,136,096 | B1* | 3/2012 | Lindahl | G06F 11/3636 714/45 |
| 8,473,269 | B1* | 6/2013 | Ou | G06F 17/5022 703/14 |
| 8,726,233 | B1* | 5/2014 | Raghavan | G06F 17/5009 717/105 |
| 8,935,673 | B1* | 1/2015 | Ashkenazi | G06F 11/3636 702/186 |
| 2003/0028858 | A1* | 2/2003 | Hines | G06F 8/36 717/125 |
| 2004/0031019 | A1* | 2/2004 | Lamanna | G06F 11/3664 717/125 |
| 2005/0093881 | A1* | 5/2005 | Okita | G06Q 10/06 345/589 |
| 2005/0216248 | A1* | 9/2005 | Ciolfi | G06F 17/5009 703/22 |
| 2005/0257194 | A1* | 11/2005 | Morrow | G06F 8/34 717/109 |
| 2007/0043547 | A1* | 2/2007 | Plun | G06F 17/5009 703/13 |
| 2008/0059739 | A1* | 3/2008 | Ciolfi | G06F 17/5009 711/162 |
| 2009/0193396 | A1* | 7/2009 | Hartadinata | G06F 11/3664 717/125 |
| 2013/0055217 | A1* | 2/2013 | Boxall | G06F 11/3624 717/129 |

OTHER PUBLICATIONS

Stateflow(R) and Stateflow Coder(R). Version 5 (2003) [Users Guide]: The MathWorks [retrieved on Jun. 5, 2017]. Section 12.*
Simulink(R). Version 5 (2002) [User's Guide]: The MathWorks [retrieved on Jun. 5, 2017. Section 5 and 13.*
"Learning Simulink 6." Release 14, The MathWorks, Chapter 10, pp. 7-1 through 7-4: ISBN 0-9755787-7-4 (2005) [retrieved on Dec. 6, 2017]. Retrieved from <http://www.engrcs.com/tools_programs/LearningSimulink.pdf>.*
Iqbal et al. "Oasis: A Framework for Linking Notification Delivery to the Perceptual Structure of Goal-Directed Tasks" ACM Transactions on Computer-Human Interaction, vol. 17, No. 4, Article 15 [retrieved on Oct. 30, 2018]. Retrieved from <https://dl.acm.org/citation.cfr?id=1879833> (Year: 2010).*
"Techniques for Debugging MATLAB M-files" The MathWorks Revision 1.0, pp. 1-30 [retrieved on Jun. 5, 2017]. Retrieved from <https://www.ee.columbia.edu/~marios/matlab/Techniques%20for%20Debugging%20MATLAB%20M-files%20(1207).pdf> (Year: 2003).*
Krasnogolowy et al. "Flexible Debugging of Behavior Models" 2012 IEEE International Conference on Industrial Technology; doi: 10.1109/ICIT.2012.6209959 [retrieved on Feb. 19, 2019]. Retrieved from <https://ieeexplore.ieee.org/document/6209959> (Year: 2012).*
King et al. "Debugging operating systems with time-traveling virtual machines" 2005 USENIX Annual Technical Conference, pp. 1-15 [retrieved from Sep. 5, 2019]. Retrieved from <https://www.usenix.org/legacy/events/usenix05/tech/general/king/king.pdf> (Year: 2005).*
Boothe. B. "Efficient Algorithms for Bidirectional Debugging" PLDI '00 Proceedings, pp. 299-310 [retrieved on Sep. 5, 2019]. Retrieved from <https://dl.acm.org/citation.cfm?id=349339> (Year: 2000).*
Lienhard et al. "Practical Object-Oriented Back-in-Time Debugging" ECOOP 2008—Object-Oriented Programming, pp. 592-615 [retrieved Sep. 5, 2019]. Retrieved from <https://rd.springer.com/chapter/10.1007/978-3-540-70592-5_25> (Year: 2008).*

* cited by examiner

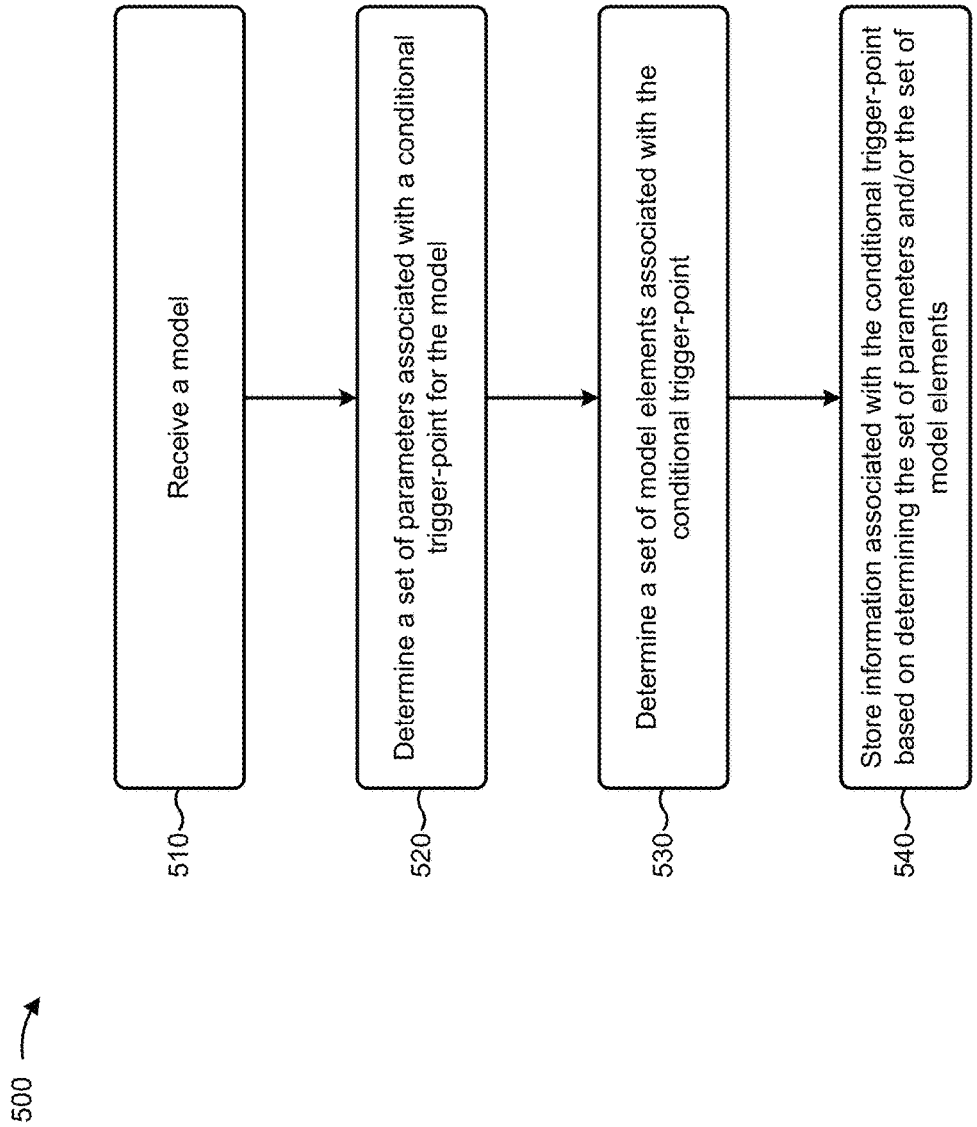

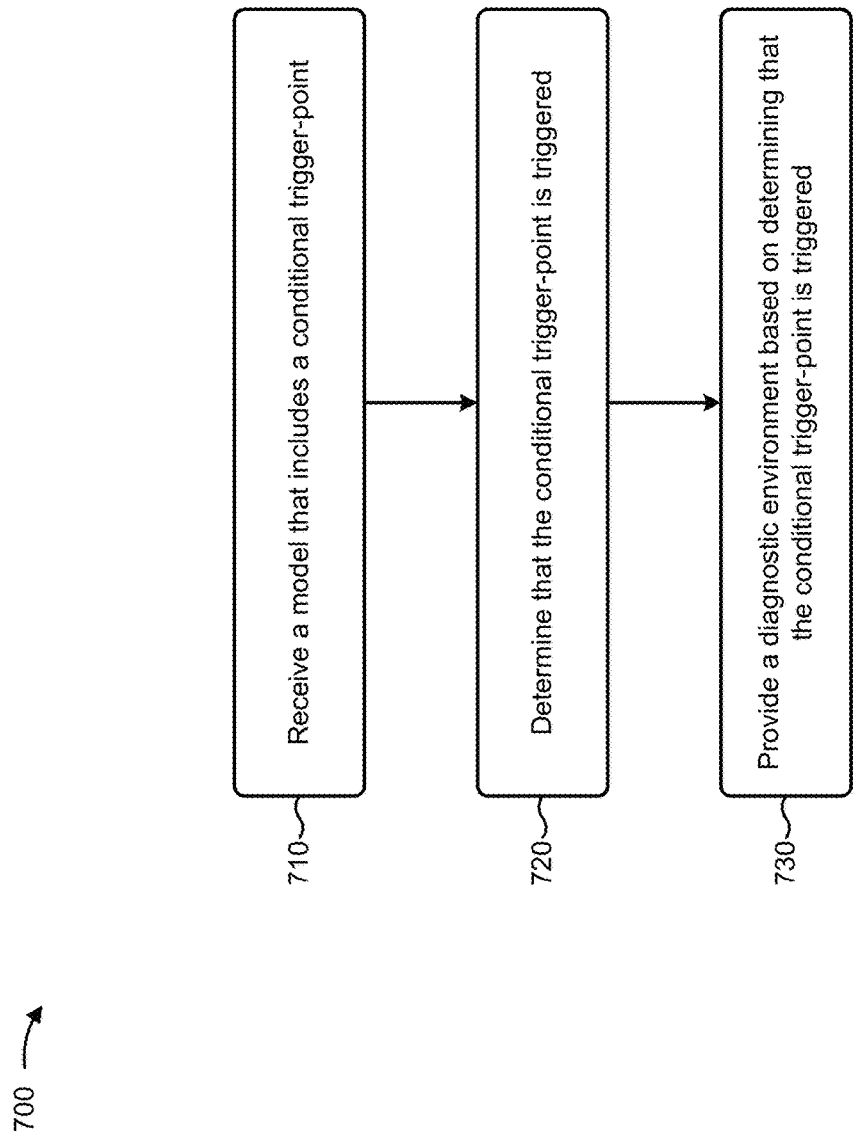

TENTATIVE MODEL COMPONENTS

BRIEF DESCRIPTION OF THE DRAWINGS

FIG. 5 is a flow chart of an example process for establishing a conditional trigger-point;

FIG. 7 is a flow chart of an example process for providing a diagnostic environment based on triggering a conditional trigger-point.

DETAILED DESCRIPTION

The following detailed description of example implementations refers to the accompanying drawings. The same reference numbers in different drawings may identify the same or similar elements.

A user may utilize a model (e.g., a graphical model) to simulate a system, simulate output of a mathematical equation, or the like. The model may include one or more diagnostic model elements for verifying that the model functions as anticipated. The model may, at times, cease execution based on a condition. However, during execution the one or more diagnostic model elements may add cognitive noise to the model (e.g., visual noise making the model less comprehensible), and the user may not be interested in viewing the one or more diagnostic elements unless the user is verifying the model, such as when the model ceases execution. Implementations, described herein, may utilize a conditional trigger-point to obscure diagnostic model elements till a condition is satisfied, thereby reducing cognitive noise and clarifying the model.

Figure 1:
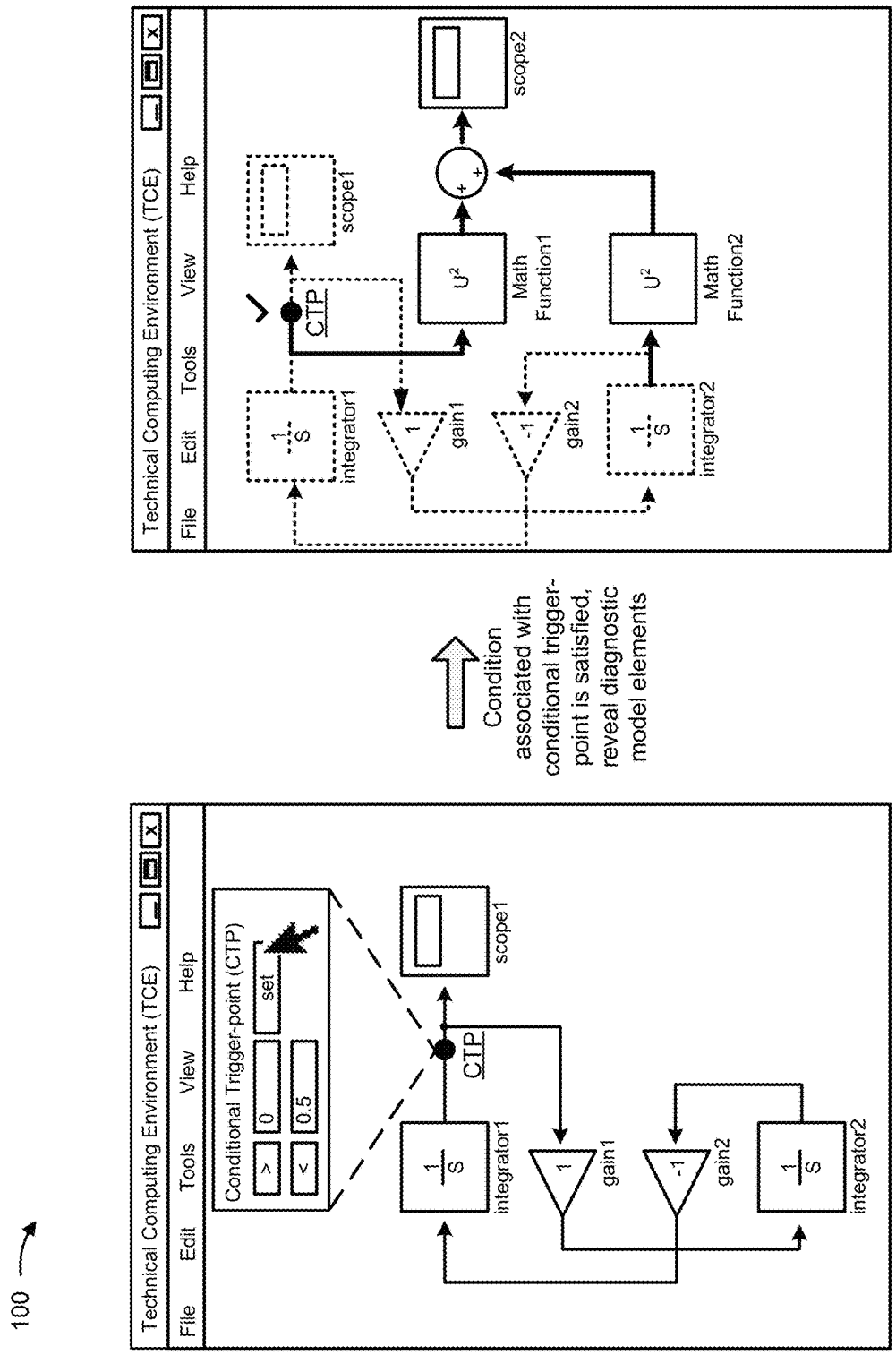
FIG. 1 is a diagram of an overview of an example implementation described herein.

FIG. 1 is a diagram of an overview of an example implementation 100 described herein. As shown in FIG. 1, example implementation 100 may include a model and a client device that includes a technical computing environment (TCE). In example implementation 100, the model includes a set of integrator blocks, a set of gain blocks, a scope block, and a set of links associated therewith, collectively associated with simulating a simple harmonic oscillator. These blocks and links may be considered core model elements because these blocks and links represent aspects of the model that the user desires to simulate. In contrast, a diagnostic model element may refer to a model element that the user intends to use to verify functionality of one or more core model elements. The client device may provide, for display via a user interface, the model. The client device may provide an indication of a conditional trigger-point (CTP), such as a generated conditional trigger-point, a user-defined conditional trigger-point, or the like, and may permit configuration of the conditional trigger-point. Based on user interaction with a button, the user may set the conditional trigger-point based on a condition, such as a particular period of time elapsing, a particular value being realized at a particular location of the model, or the like. The client device may receive an indication of a set of model elements associated with the conditional trigger-point. This set of model elements associated with the conditional trigger-point may be considered diagnostic model elements because this set of model elements are intended to be utilized to verify functionality of the simple harmonic oscillator.

As further shown in FIG. 1, during execution of the model, the client device may determine that the condition has been satisfied. Based on the condition being satisfied, the client device may provide a diagnostic environment for use by the user. For example, the client device may hide a portion of the model (e.g., one or more core model elements not associated with the conditional trigger-point), obscure a portion of the model (e.g., reduce a visibility associated with the set of integrator blocks, the set of gain blocks, the "scope1" block, and the set of links associated therewith by utilizing dashed lines), or the like. Further to the example, the client device may provide information identifying one or more diagnostic model elements (e.g., "Math Function1," "MathFunction2," an addition operation block, a scope block associated with providing information indicating a result of the addition operation block being executed, and a set of links associated therewith) associated with the conditional trigger-point, such as a set of model elements associated with verifying that the model is functioning as anticipated. In this way, a user may selectively view a set of model elements designated as diagnostic model elements associated with a conditional trigger-point when the conditional trigger-point is triggered, thereby reducing visual noise associated with the set of model elements when the user does not need to view the set of model elements. Additionally, graphical modeling may be improved by increased granularity as a result of the ability to indicate that portions of a model are diagnostic portions not utilized as part of a core portion of the model. Furthermore, the client device may realize savings in processing and storage as a result of being able to omit portions of the model from execution and code generation based on association with a conditional trigger-point.

Figure 2:
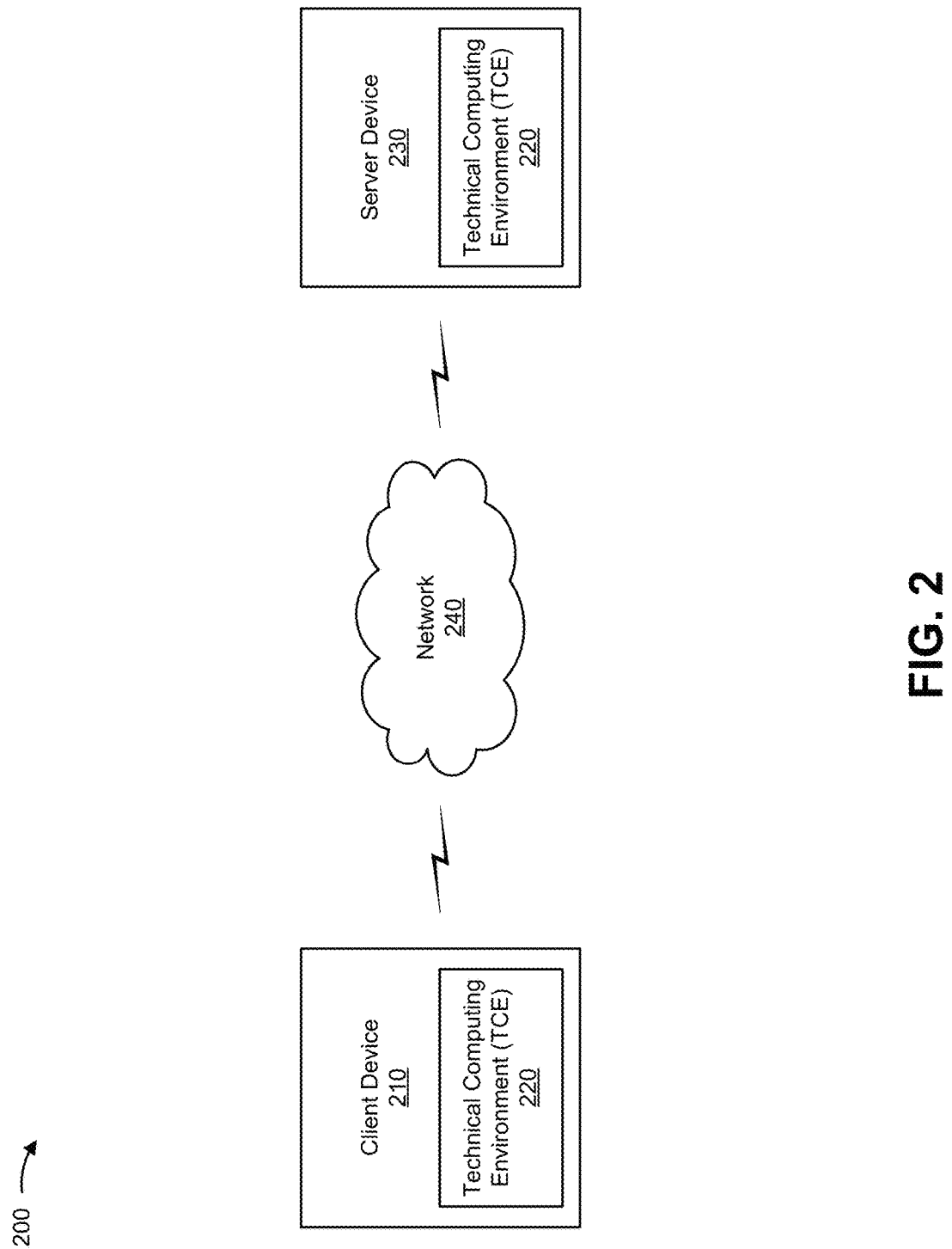
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, processing, and/or providing information associated with a model (e.g., a model element, a block, an input signal, a portion of program code, a conditional trigger-point, or the like). For example, client device 210 may include a computing device, such as a desktop computer, a laptop computer, a tablet computer, a mobile phone (e.g., a smart phone, a radiotelephone, etc.), or a similar device. Client device 210 may establish a conditional trigger-point associated with a portion of the model and may determine that a condition associated with the conditional trigger-point has been met. In some implementations, client device 210 may provide a graphical user interface (GUI) for viewing and/or interacting with a model and/or one or more features associated therewith. In some implementations, client device 210 may receive information from and/or transmit information to server device 230.

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.), a graphically-based environment (e.g., Simulink® software, Stateflow® software, SimEvents® software, Simscape™ software etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment. In some implementations, TCE 220 may include, for example, a user interface and/or enable simulation and execution of hardware and/or software systems. In some implementations, TCE 220 may include a high-level architecture (HLA) that facilitates performing a simulation, such as performing a distributed simulation.

TCE 220 may be integrated with or operate in conjunction with a modeling environment, which may provide graphical tools for constructing models (e.g., graphical models) of systems and/or processes. TCE 220 may include additional tools, such as tools designed to convert a model into an alternate representation, such as an alternate model format, code or a portion of code representing source computer code and/or compiled computer code, a hardware description (e.g., a specification of a digital circuit, a description of a circuit layout, etc.), or the like. TCE 220 may also include tools to convert a model into project files for use in an integrated development environment (IDE) such as Eclipse by Eclipse Foundation, IntelliJ IDEA by JetBrains or Visual Studio by Microsoft. A model (e.g., a graphical model) may include one or more model elements that simulate characteristics of a system and/or a process. Each model element may be associated with a graphical representation thereof that may include a set of objects, such as process blocks (e.g., block diagram blocks), ports, connector lines, or the like.

Server device 230 may include one or more devices capable of receiving, generating, storing, processing, and/or providing a model and/or information associated with a model. For example, server device 230 may include a computing device, such as a server, a desktop computer, a laptop computer, a tablet computer, or a similar device. In some implementations, server device 230 may host TCE 220. In some implementations, client device 210 may be used to access one or more TCEs 220 running on one or more server devices 230. For example, multiple server devices 230 may be used to execute program code (e.g., serially or in parallel) and may provide respective results of executing the program code to client device 210. In some implementations, server device 230 may include multiple TCEs 220, such as via a set of virtual machines.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks. In some implementations, network 240 may include one or more heterogeneous networks, such as a set of networks including an open-public network, a private network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
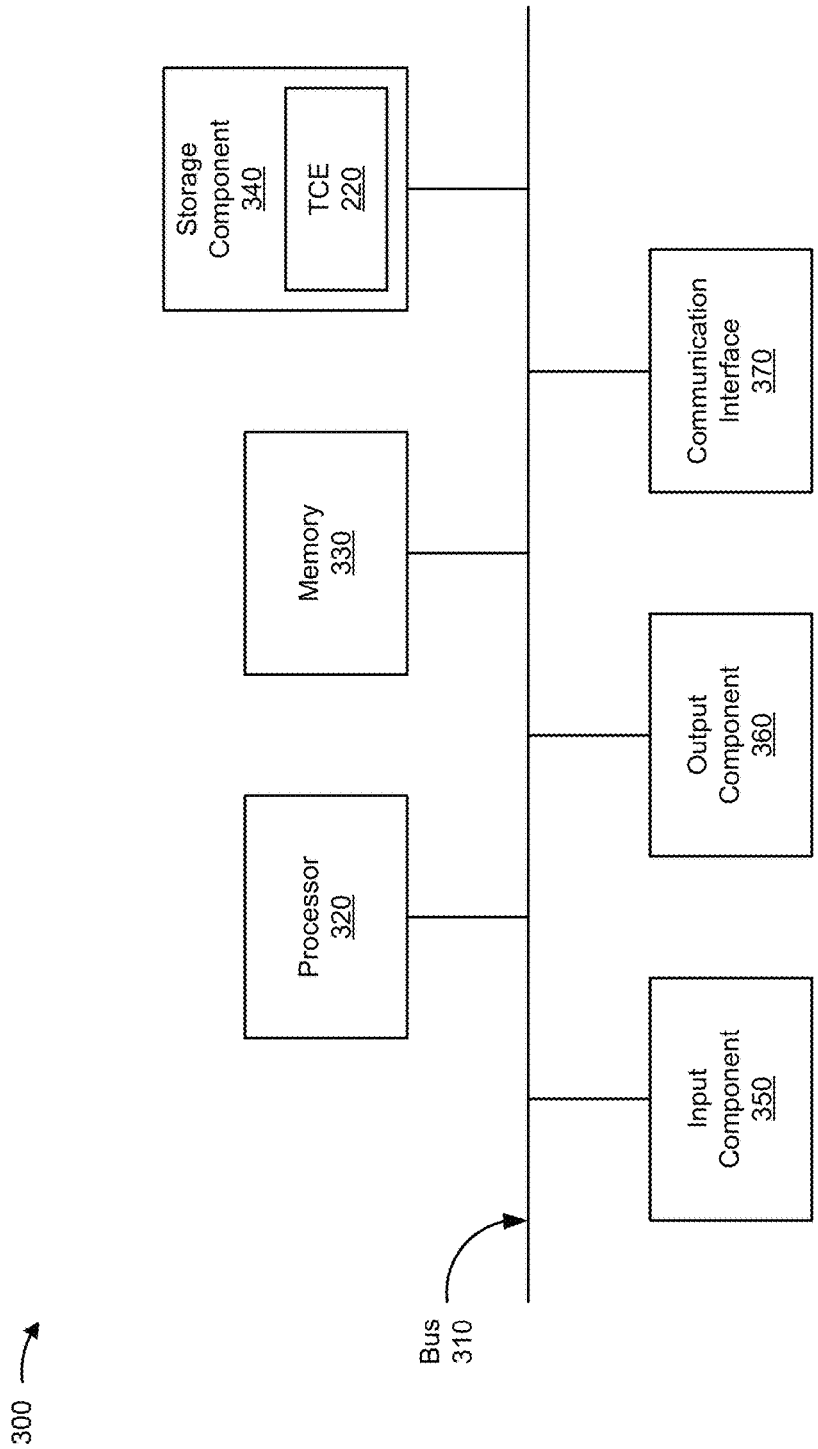
FIG. 3 is a diagram of example components of one or more devices of FIG. 2.

FIG. 3 is a diagram of example components of a device 300. Device 300 may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions, and/or that is designed to implement one or more computing tasks. In some implementations, processor 320 may include multiple processor cores for parallel computing. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
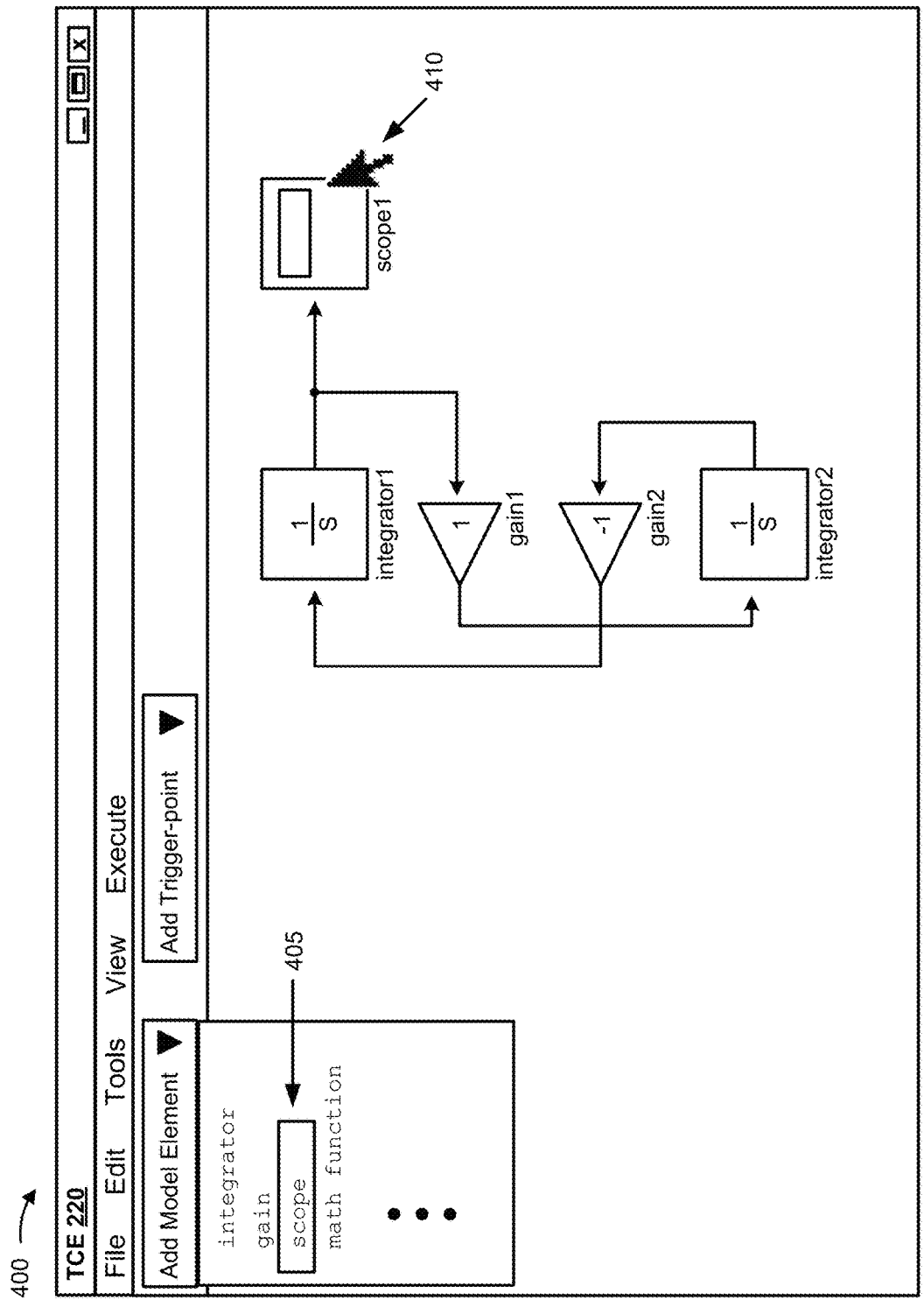
FIGS. 4A-4C are diagrams of an example implementation of establishing a conditional trigger-point.
Figure 4B:
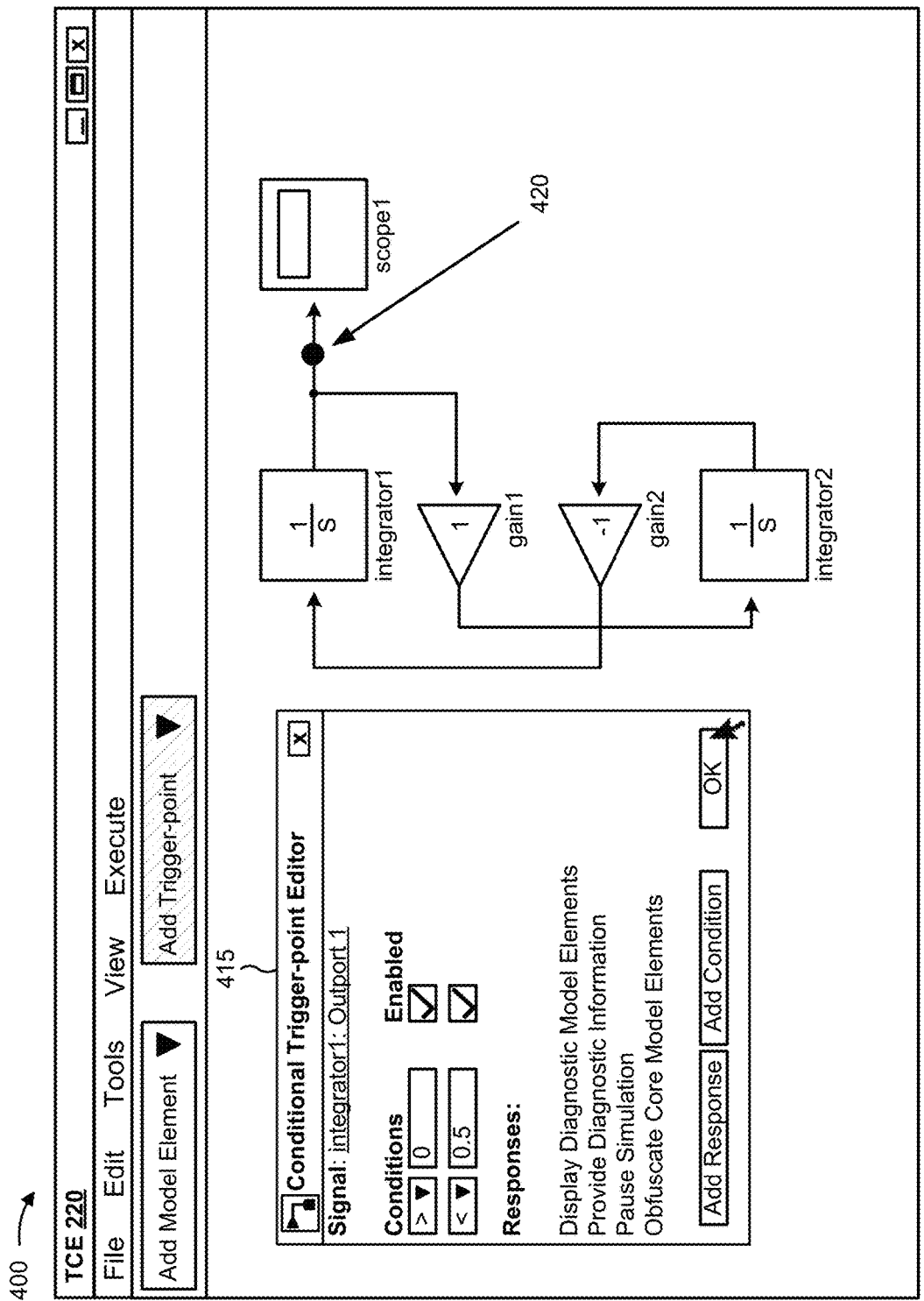
Figure 4C:
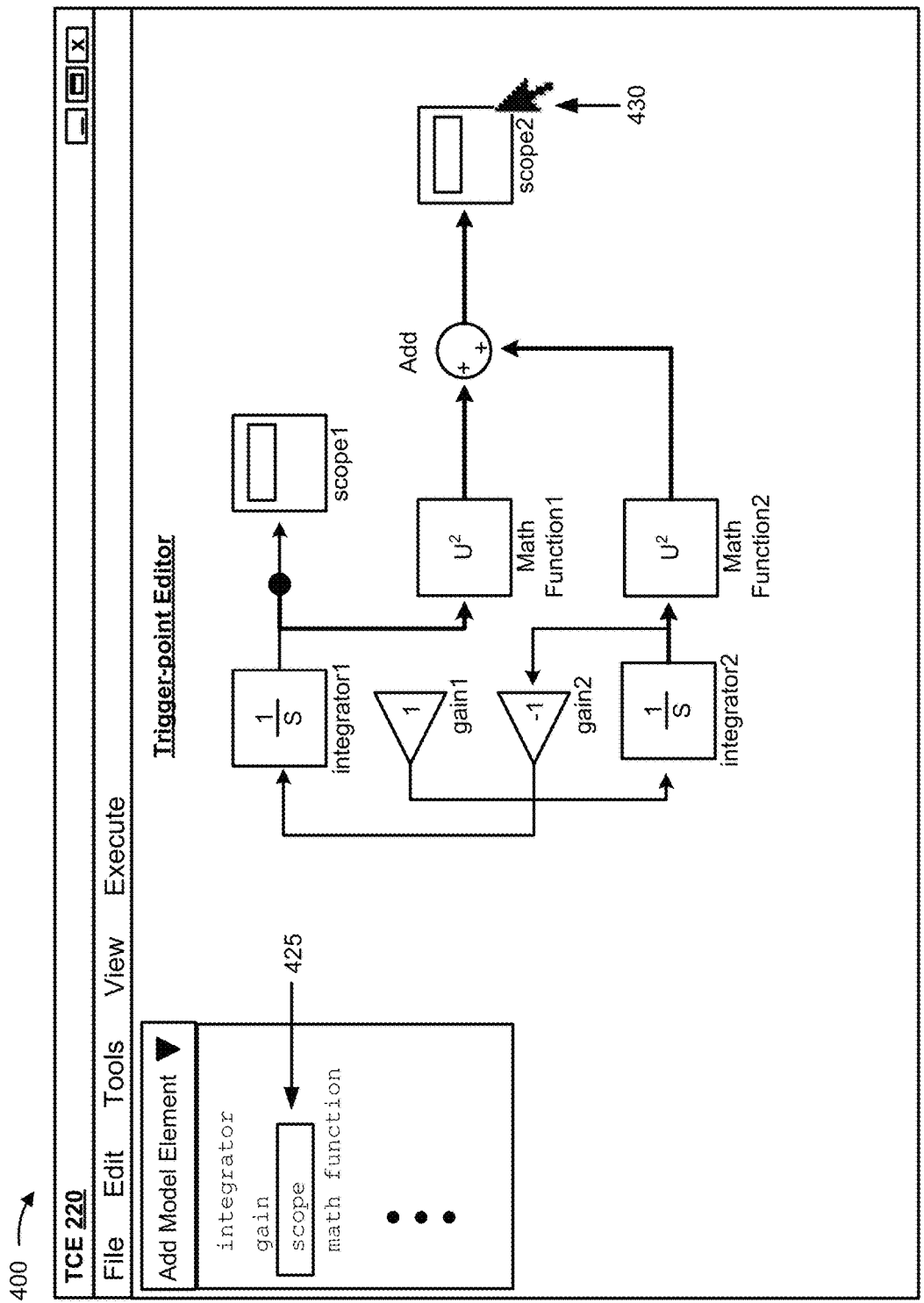

FIGS. 4A-4C are diagrams of an example implementation 400 of establishing a conditional trigger-point.

As shown in FIG. 4A, a model may include a set of core model elements, such as an "integrator1" integrator block, a "gain1" gain block, a "gain2" gain block, an "integrator2" integrator block, and directed relationships (e.g., connectors) associated therewith. As shown by reference number 405, a user may add another core model element (e.g., via a user interface), such as a scope model element associated with displaying an input with respect to simulation time, to a model (e.g., a core portion of the model). As shown by reference number 410, the user may position the model element, which has been named "scope1," at a particular position associated with the model. In this case, the user has configured a graphical model that includes the set of model elements which are associated with simulating a simple harmonic oscillator.

As shown in FIG. 4B, based on user interaction with a button of the user interface, the user may indicate that the user desires to add a conditional trigger-point. As shown by reference number 415, client device 210 may provide an editor window for selecting a condition for triggering the conditional trigger-point. Assume, for example implementation 400, the user enables two conditions, a first condition associated with triggering the conditional trigger-point when an output value for "integrator1" is greater than 0 and a second condition associated with triggering the conditional trigger-point when the output value for "integrator1" is less than 0.5. The user selects a set of responses to the conditional trigger-point being triggered, such as displaying a set of diagnostic model elements, providing diagnostic information associated with the graphical model, pausing the simulation, and obscuring the set of core model elements. As shown by reference number 420, the user may select the particular location of the graphical model at which to establish the conditional trigger-point (e.g., at a link between an integrator block and a scope block). In another example, the user may associate the conditional trigger-point with a model element and values internal to the model element instead of with a connector between model elements and values being transferred via the connector. In another example, the conditional trigger-point may utilize information associated with a model element, such as a variable value, as a condition (e.g., the condition may be utilized to set the condition that is evaluated).

As shown in FIG. 4C, client device 210 may receive, via interaction with the user interface, a user selection of a set of model elements (e.g., diagnostic model elements) to be associated with the conditional trigger-point. Assume that the user positions a particular set of model elements (e.g., a "Math Function1" block and a "Math Function2" block) associated with squaring a value, and an addition block, "Add," associated with adding values of the particular set of model elements. As shown by reference number 425, the user may select another model element (e.g., another diagnostic model element) and, as shown by reference number 430, may position the other model element (e.g., a scope block, "scope2") associated with providing information regarding a value of the addition block. The set of diagnostic elements may be associated with verifying functionality of the simple harmonic oscillator modeled by the core model elements, thereby facilitating model diagnostics.

As indicated above, FIGS. 4A-4C are provided merely as an example. Other examples are possible and may differ from what was described with regard to FIGS. 4A-4C.

FIG. 5 is a flow chart of an example process 500 for establishing a conditional trigger-point. In some implementations, one or more process blocks of FIG. 5 may be performed by client device 210. In some implementations, one or more process blocks of FIG. 5 may be performed by another device or a group of devices separate from or including client device 210, such as TCE 220 and/or server device 230.

As shown in FIG. 5, process 500 may include receiving a model (block 510). For example, client device 210 (e.g., TCE 220) may receive a model (e.g., a graphical model). In some implementations, client device 210 (e.g., TCE 220) may receive the model based on a user creating the model. For example, a user may cause client device 210 to create or open a user interface. The user may then add one or more model blocks and/or model elements to the user interface to create the model. For example, in some implementations, client device 210 may receive a command, from the user, that indicates that a model block and/or a model element is to be added to the user interface. Client device 210 may receive the command based, for example, on detecting a selection of a particular menu item, entry of a particular textual or audible input from the user, and/or entry of some other predetermined input that indicates a desire to add a model block and/or a model element to the user interface. As another example, client device 210 may receive input (e.g., a drag and drop) that indicates that a model block and/or a model element, included in a block library and/or a model element library associated with TCE 220, is to be added to the user interface. Based on the command, client device 210 may add the model block and/or the model element to the user interface.

In some implementations, client device 210 may receive information identifying the model, such as a name of the model, and information identifying a memory location at which the model is stored. The memory location may be located within client device 210 or external to, and possibly remote from, client device 210. Client device 210 may, based on receiving the request, retrieve the model from the memory location.

As further shown in FIG. 5, process 500 may include determining a set of parameters associated with a conditional trigger-point for the model (block 520). For example, client device 210 (e.g., TCE 220) may determine the set of parameters associated with a conditional trigger-point for the model. A conditional trigger-point may refer to a particular aspect of a model that includes conditional logic, fulfillment of which may result in a particular response. For example, a particular conditional trigger-point may be associated with a particular location of the model (e.g., a particular location of a core portion of the model, a particular location of a diagnostic portion of the model associated with another conditional trigger-point, or the like) and may include conditional logic indicating that when a particular condition is satisfied, a particular response is to occur.

The conditional trigger-point may be associated with a particular set of parameters, such as a parameter associated with the conditional logic, in some implementations. For example, a condition for triggering the conditional trigger-point may be associated with a particular value occurring, a particular time elapsing, a computing resource satisfying a threshold usage (e.g., a CPU execution time, a stack usage, a buffer overflow, etc.), an anomalous value in a scope diagram reoccurring, an error occurring, a warning occurring, a user action (e.g., a user causing execution of the model to be paused), or the like.

The conditional trigger-point may be associated with another parameter, such as a parameter associated with a response to triggering the conditional trigger-point, in some implementations. For example, the conditional trigger-point may include a parameter indicating that when the condition is satisfied, client device 210 is to pause simulation, continue simulation, revert to a previous time-step of simulation, or the like. Additionally, or alternatively, the parameter may indicate that client device 210 is to obscure a portion of the model, provide, for display, another portion of the model, remove, from display, a portion of the model. For example, the parameter may identify one or more model elements that are to be obscured, provided, or the like when the condition associated with the conditional trigger-point is satisfied. Additionally, or alternatively, the parameter may indicate that client device 210 is to cause different sets of model elements to be displayed via multiple layers and/or planes of a three-dimensional display, a pseudo three-dimensional display, a two-dimensional display, or the like.

Additionally, or alternatively, the parameter may indicate that client device 210 is to provide information associated with the condition (e.g., information identifying the condition, information identifying code coverage, information identifying model coverage, information identifying values for one or more model elements, or the like), information associated with the model (e.g., a quantity of model elements executed prior to the condition being satisfied), information associated with altering the model, such as via a diagnostic environment that facilitates altering the model, generating another version of the model, or the like. In some implementations, the parameter may indicate that client device 210 is to incorporate one or more model elements of the set of diagnostic model elements into the set of core model elements.

In some implementations, the conditional trigger-point may be associated with a code generation parameter. For example, parameter may indicate to client device 210 that code generated for the model is not to include code associated with the conditional trigger-point and/or a set of model elements associated with the conditional trigger-point. In this way, a user may utilize a modeling environment to verify a model without having a set of model elements associated with verification included in automatically generated code. In this way, client device 210 may omit unwanted portions of the model from code generation, thereby reducing processing requirements, storage requirements, or the like associated with code generation.

In some implementations, client device 210 may receive information identifying the set of parameters associated with the conditional trigger-point. For example, client device 210 may receive an identification of a configuration file that includes the set of parameters, a user indication of the set of parameters (e.g., via a user interaction with a user interface), or the like. Additionally, or alternatively, client device 210 may determine the set of parameters of the conditional trigger-point. For example, client device 210 may determine the set of parameters based on the model, a location associated with the conditional trigger-point, a condition associated with the conditional trigger-point, a response associated with the conditional trigger-point, other conditional trigger-points created by a user, other conditional trigger-points associated with other models, or the like.

Additionally, or alternatively, client device 210 may process a portion of the model to determine the set of parameters associated with a conditional trigger-point. For example, client device 210 may determine, based on the model, that a set of errors and/or warnings may occur at a particular location of the model (e.g., a divide by zero error, a negative square root error, a negative square root warning, a divide by zero warning, such as a "not a number" (NaN) warning, or the like), and may determine a set of parameters for a conditional trigger-point associated with testing the set of errors. In some implementations, client device 210 may update parameters of a particular conditional trigger-point associated with a first location based on a second location at which the particular conditional trigger-point is positioned. For example, when a user indicates that a conditional trigger-point is to be moved and/or copied from a first location to a second location in the model, client device 210 may determine a set of parameters associated with the first location (e.g., a variable value, a data type, a set of associated model elements, or the like) and may update the set of parameters based on the second location (e.g., another variable value of the second location, another data type associated with a signal of the second location, another set of associated model elements proximate to the second location, or the like).

As further shown in FIG. 5, process 500 may include determining a set of model elements associated with the conditional trigger-point (block 530). For example, client device 210 (e.g., TCE 220) may determine the set of model elements of the model associated with the conditional trigger-point. In some implementations, client device 210 may determine that a particular model element is associated with the conditional trigger-point based on a user indication. For example, a user may select and position the particular model element via a user interface and may provide information associating the particular model element with the conditional trigger-point. In this way, as shown by FIG. 4C, the user may indicate that a model element is diagnostic (e.g., the particular model element is associated with a particular conditional trigger-point). Conversely, a user may indicate that a particular model element is a core model element (e.g., the particular model element is not associated with a particular conditional trigger-point). In some implementations, client device 210 may determine that a particular model element is associated with the conditional trigger-point based on a location of the particular model element, a model element type of the particular model element, or the like.

In some implementations, client device 210 may determine the set of model elements associated with the conditional trigger-point based on an execution mode of the model. For example, when client device 210 is providing a diagnostic mode associated with the model, such as when execution is paused as a result of a conditional trigger-point being triggered as described herein with regard to FIG. 7, client device 210 may associate a model element that is added during the diagnostic mode with the conditional trigger-point.

In some implementations, client device 210 may alter the model to determine the set of model elements associated with the conditional trigger-point. For example, client device 210 may add linkages associated with an input to a conditional trigger-point. Additionally, or alternatively, client device 210 may alter a model element to incorporate the conditional trigger-point, and may associate the altered model element with the conditional trigger-point.

In some implementations, client device 210 may determine an input to the conditional trigger-point that may be associated with the condition when determining the set of model elements associated with the conditional trigger-point. For example, when the condition involves a particular value being reached, client device 210 may incorporate a linkage as a conditional model element associated with providing an input to the conditional trigger-point. In this case, the condition may be triggered based on the input to the conditional trigger-point.

As further shown in FIG. 5, process 500 may include storing information associated with the conditional trigger-point based on determining the set of parameters and/or the set of model elements (block 540). For example, client device 210 (e.g., TCE 220) may store information associated with the conditional trigger-point, such as information identifying the set of parameters associated with the conditional trigger-point, information identifying the set of model elements associated with the conditional trigger-point, or the like. In some implementations, client device 210 may store information associated with the conditional trigger-point via a trigger-point library, thereby creating a repository of conditional trigger-points, such as a textual list of conditional trigger-points, a graphical list of conditional trigger-points, or the like, that may be selected and added to a model by a user. Additionally, or alternatively, the repository may facilitate referencing locations of the model. For example, when information regarding a conditional trigger-point is stored via a repository, a reference to the location at which the conditional trigger-point is located within the model may be stored, and when source functionality associated with the model is altered, client device 210 may update information associated with the reference. In some implementations, client device 210 may include an indication of the conditional trigger-point with the model when storing information associated with the conditional trigger-point. For example, client device 210 may remove a graphical indication of model elements associated with the conditional trigger-point from the user interface displaying the model but may include a graphical indication of a location associated with the conditional trigger-point. In this case, client device 210 may provide stored information associated with the conditional trigger-point based on a user indication, such as a mouse-over the location associated with the conditional trigger-point, a mouse-click of the location associated with the conditional trigger-point, or the like. The stored information may include textual information about configuration of the conditional trigger-point, such as conditions associated therewith, parameters selected for the conditional trigger-point, or the like, graphical information regarding model elements associated with the conditional trigger-point (e.g., that may be displayed on the model, via a pop-up window, etc.), or the like.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of an example implementation 600 of providing a diagnostic environment based on triggering a conditional trigger-point.

Figure 6A:
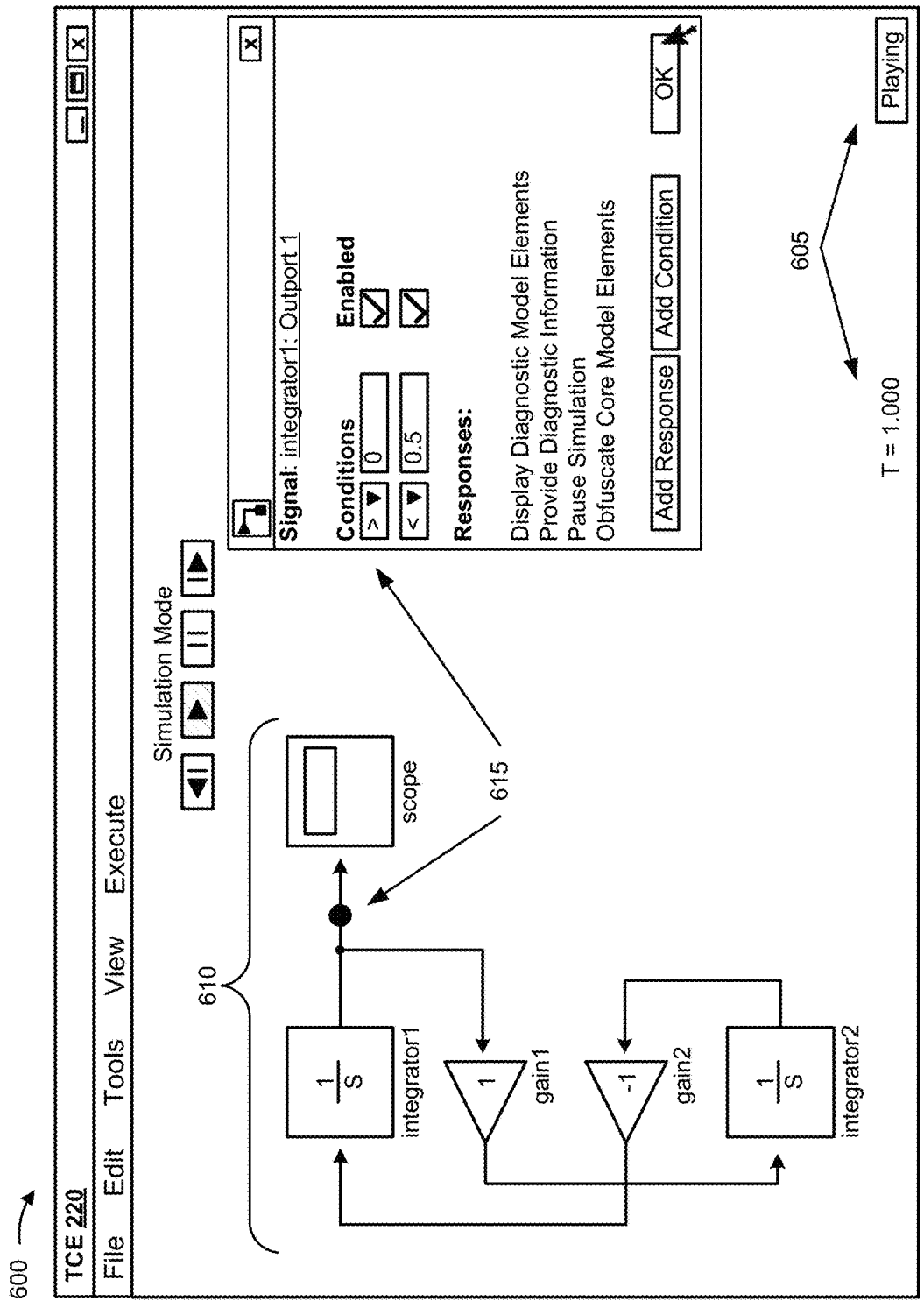
FIGS. 6A-6D are diagrams of an example implementation of providing a diagnostic environment based on triggering a conditional trigger-point.

With reference to FIG. 6A, assume that the user has created the model shown in FIG. 4C, and has established a conditional trigger-point with the conditions (e.g., that the conditional trigger-point is triggered when an output value for "integrator1" is greater than 0 and when the output value for "integrator1" is less than 0.5) and responses (e.g., that client device 210 is to cause the set of diagnostic model elements to be displayed, provide diagnostic information, pause the simulation, and cause the set of core model elements to be obscured) selected in FIG. 4B. Further assume that the user causes the model to be executed.

As shown in FIG. 6A, and by reference number 605, client device 210 provides, via a user interface, an indication that the model is being executed, and that execution is at a particular time-step (e.g., "T=1.000" seconds). As shown by reference number 610, client device 210 provides a graphical indication, via the user interface, of the model (e.g., a simple harmonic oscillator that includes a set of integrator blocks, a set of gain blocks, a scope block, and a set of links associated therewith). As shown by reference number 615, the conditional trigger-point is included in the model at a particular location of the model, but no model elements associated with the conditional trigger-point are displayed. Assume that client device 210 monitors execution of the model and determines that the condition is satisfied.

Figure 6B:
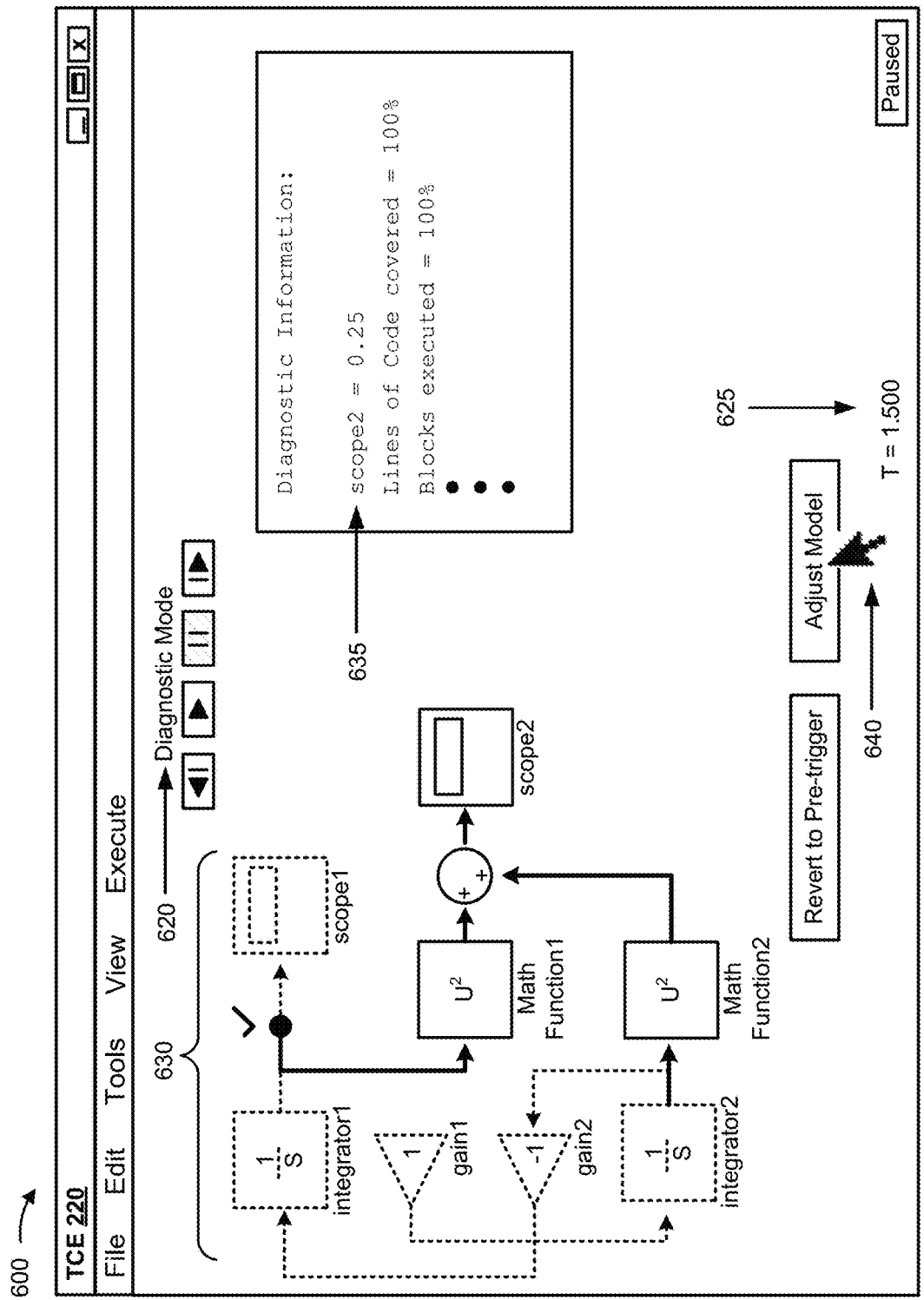

As shown in FIG. 6B, and by reference number 620, based on the condition being satisfied, client device 210 enters a diagnostic environment in which to provide the specified responses at a particular time-step (e.g., "T=1.500"

(seconds)) of execution of the model, as shown by reference number 625. As shown by reference number 630, client device 210 provides, via the user interface, the set of diagnostic model elements associated with the conditional trigger-point (e.g., a set of math function blocks, an addition block, and a "scope2" block, collectively associated with verifying that the set of core model elements representing the simple harmonic oscillator are functioning as intended) and obscures the set of core model elements (i.e., the set of integrator blocks, the set of gain blocks, and the "scope1" block, collectively associated with simulating a simple harmonic oscillator). As shown by reference number 635, client device 210 provides diagnostic information associated with the conditional trigger-point, such as an indication of a value of a particular model element (e.g., information indicating that the "scope2" block equals 0.25), a quantity of lines of code associated with the model that have been executed (e.g., "Lines of Code covered=100%"), and a quantity of model elements that have been executed (e.g., "Blocks executed=100%"). In this way, a user may verify that the model is functioning as expected. As shown by reference number 640, based on a user interaction with a button, the user may indicate a desire to adjust the model.

Figure 6C:
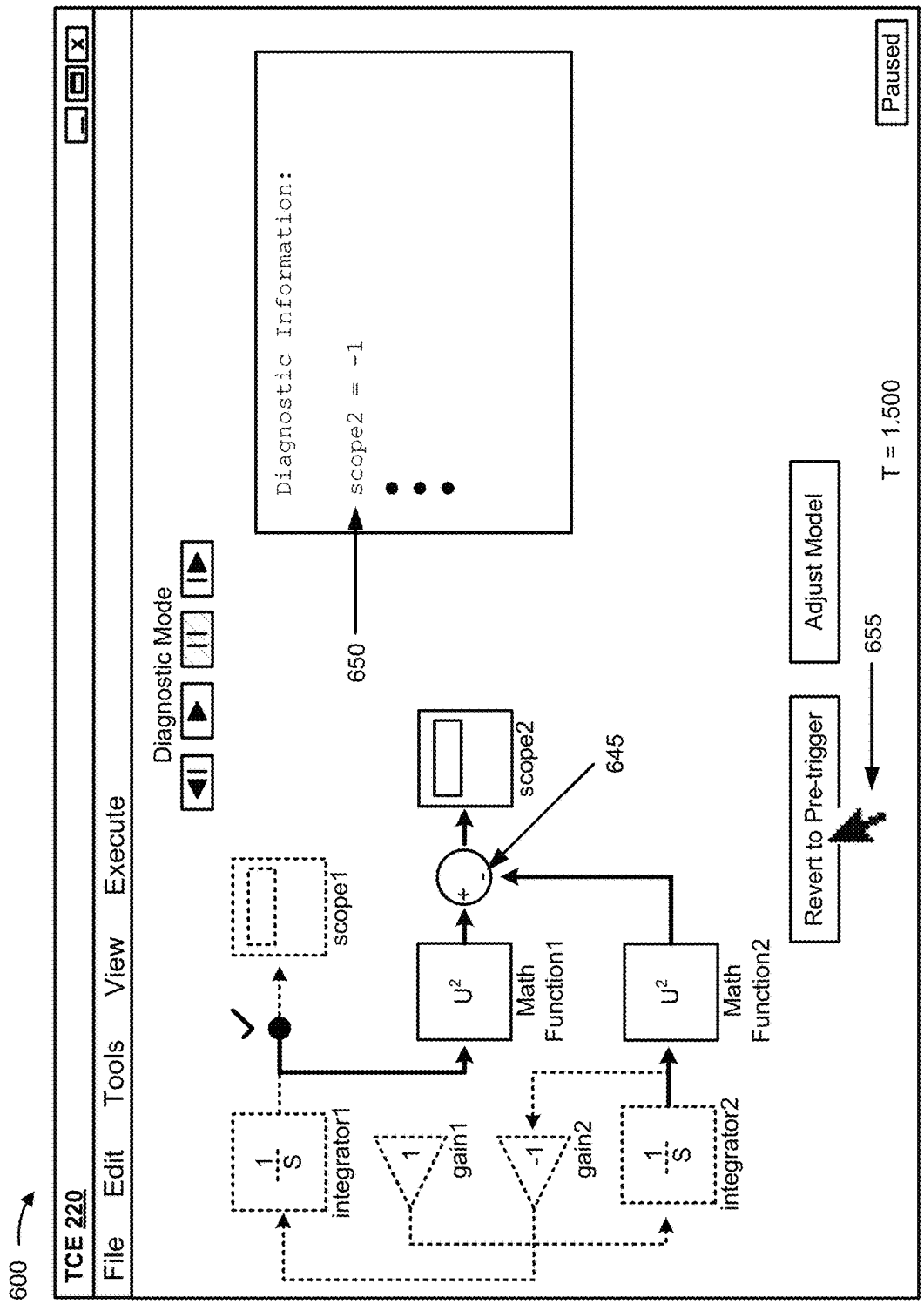

As shown in FIG. 6C, and by reference number 645, the user, based on interaction with the user interface, alters the addition block, which is associated with adding the set of math function blocks, to a subtraction block. In this way, the user may manipulate the model. Assume that client device 210 re-executes the model based on altering the addition block to the subtraction block and, as shown by reference number 650, provides other diagnostic information indicating another value for the "scope2" block (e.g., "scope2=−1") based on re-executing the model. As shown by reference number 655, based on user interaction with a button, the user may indicate a desire to revert the model to a state prior to the conditional break-point being triggered.

Figure 6D:
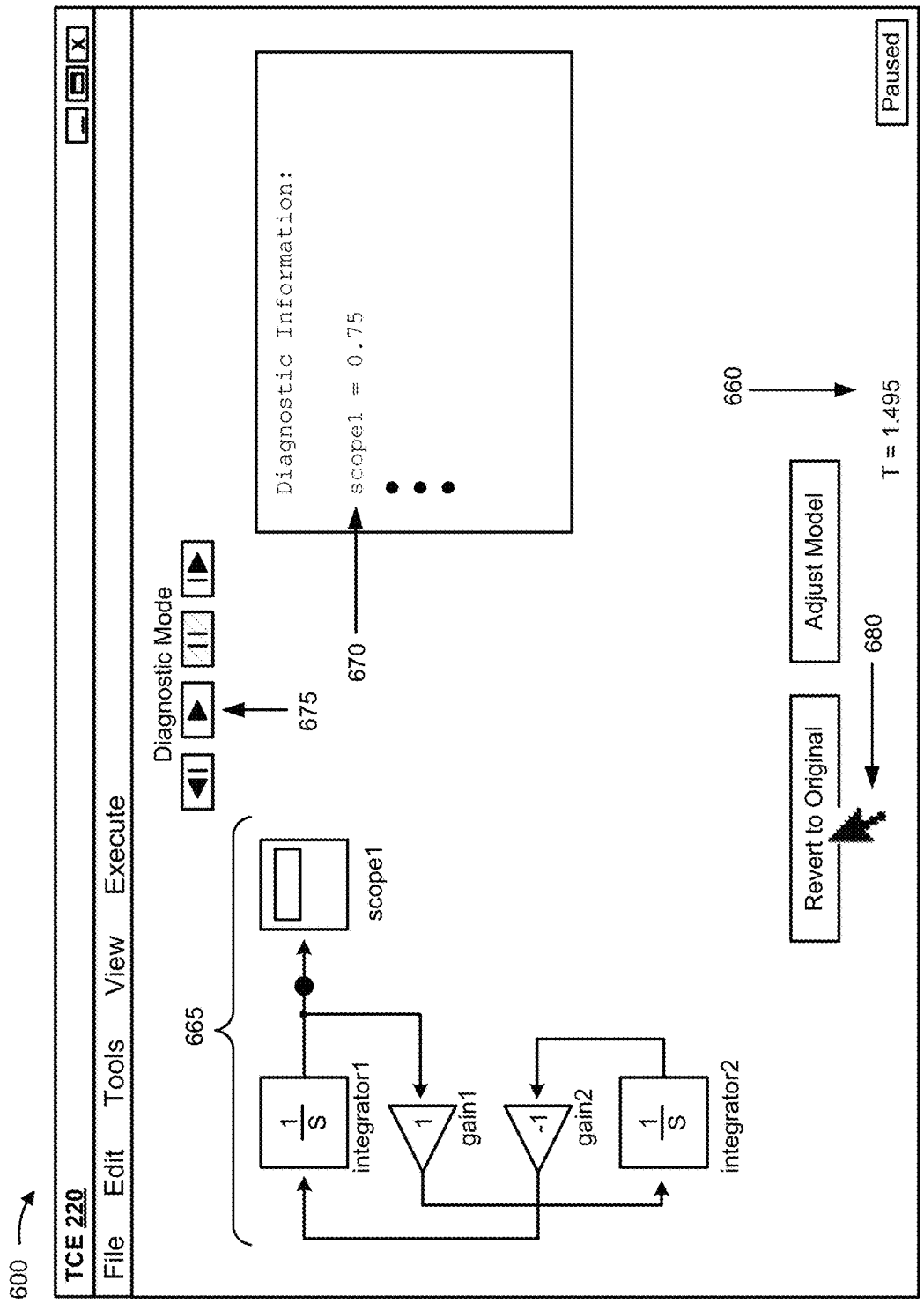

As shown in FIG. 6D, and by reference number 660, the model is reverted to a particular time-step (e.g., "T=1.495" seconds) prior to the conditional trigger-point being triggered (e.g., at "T=1.500" seconds). As shown by reference number 665, based on client device 210 reverting the model to the state prior to the conditional trigger-point being triggered, client device 210 provides, via the user interface, the model without the set of model elements associated with the conditional trigger-point (e.g., the diagnostic model elements). As shown by reference number 670, client device 210 provides diagnostic information indicating a value (e.g., 0.75) for a model element (e.g., the "scope1" block) at a prior time-step. As shown by reference number 675, a user may instruct client device 210 to execute the model with the alteration to the aspect of the model element (e.g., with the addition block associated with the conditional trigger-point altered to a subtraction block). As show by reference number 680, based on user interaction with another button, the user may instruct client device 210 to revert to an original state of the model prior to the model being altered. In this way, the user may alter and/or test aspects of the model via the diagnostic environment. Furthermore, client device 210 may execute an altered model and/or revert to an unaltered model. In another example, when a conditional trigger-point is triggered, changes may be made to model elements associated with the conditional trigger point as well as core model elements, and when the diagnostic mode is exited, changes to the core model elements may be reverted.

As indicated above, FIGS. 6A-6D are provided merely as an example. Other examples are possible and may differ from what was described with regard to FIGS. 6A-6D.

FIG. 7 is a flow chart of an example process 700 for providing a diagnostic environment based on triggering a conditional trigger-point. In some implementations, one or more process blocks of FIG. 7 may be performed by client device 210. In some implementations, one or more process blocks of FIG. 7 may be performed by another device or a group of devices separate from or including client device 210, such as server device 230.

As shown in FIG. 7, process 700 may include receiving a model that includes a conditional trigger-point (block 710). For example, client device 210 (e.g., TCE 220) may receive the model that includes the conditional trigger-point. In some implementations, client device 210 may receive the model, and a user may provide information associated with the conditional trigger-point, as discussed herein with regard to FIG. 5. For example, client device 210 may receive information associated with generating a model and may receive information associated with establishing a conditional trigger-point for the model. In some implementations, client device 210 may receive multiple conditional trigger-points for the model. For example, client device 210 may receive a particular model that includes a first conditional trigger-point associated with a first location of the model and a second conditional trigger-point associated with a second location of the model. Additionally, or alternatively, client device 210 may receive multiple conditional trigger-points associated with the same location. In some implementations, client device 210 may receive information identifying a set of model elements, of the model, associated with the conditional trigger-point (e.g., a set of diagnostic model elements).

As further shown in FIG. 7, process 700 may include determining that the conditional trigger-point is triggered (block 720). For example, client device 210 (e.g., TCE 220) may determine that the conditional trigger-point is triggered. In some implementations, client device 210 may determine that the conditional trigger-point is triggered based on a condition associated with the conditional trigger-point being satisfied. For example, client device 210 may determine, during execution of the model, that a particular value has been realized at a particular location of the model, that a particular threshold has been satisfied, that a particular quantity of time has elapsed, that a particular quantity of code has been executed, that a particular quantity of model elements have been executed, or the like. In some implementations, execution of the model may include execution of core model elements, diagnostic model elements, and/or a combination of core model elements and diagnostic model elements. In some implementations, client device 210 may determine that the conditional trigger-point is triggered based on a user indication. For example, a user may interact with a user interface during execution of the model and may trigger the conditional trigger-point. In some implementations, client device 210 may determine that the conditional trigger-point is triggered based on monitoring execution of the model. For example, client device 210 may monitor TCE 220 during execution of the model by TCE 220 to determine whether the condition associated with triggering the conditional trigger-point is satisfied.

In some implementations, client device 210 may execute program code based on the conditional trigger-point being triggered. For example, client device 210 may cause a portion of program code associated with the model, associated with a functionality of the model, associated with performing another simulation, or the like to be executed based on the conditional trigger-point being triggered. Additionally, or alternatively, client device 210 may cause a particular portion of a model to be executed, such as a model element of the model that includes the conditional trigger-point, a model element of another model, or the like.

As further shown in FIG. 7, process 700 may include providing a diagnostic environment based on determining that the conditional trigger-point is triggered (block 730). For example, client device 210 (e.g., TCE 220) may provide the diagnostic environment based on determining that the conditional trigger-point is triggered. In some implementations, client device 210 may provide, for display, a set of model elements associated with the conditional trigger-point, may provide, for display, a set of model elements associated with a condition of the conditional trigger-point (e.g., a set of model elements that altered a value associated with the condition at a particular quantity of time-steps prior to the condition being satisfied), may obscure another set of model elements not associated with the conditional trigger-point, may provide information associated with the conditional trigger (e.g., information identifying a condition that is satisfied, information identifying code coverage, information identifying model coverage, information identifying values for one or more model elements, or the like). Additionally, or alternatively, client device 210 may cause different sets of model elements (e.g., a core set of model elements, one or more diagnostic sets of model elements, or the like) to be displayed via multiple layers and/or planes of a three-dimensional display, a pseudo-three-dimensional display, a two dimensional display, or the like. In some implementations, client device 210 may provide an indication of model elements that executed prior to the condition being satisfied (e.g., all model elements that executed, model elements that are associated with a value utilized by the condition within a particular quantity of time-steps prior to the condition being satisfied, etc.). In other words, client device 210 may cause whatever response is associated with conditional trigger-point being triggered to be performed based on satisfaction of the condition associated with the conditional trigger-point.

In some implementations, client device 210 may pause execution of the model based on the conditional trigger-point being triggered. Additionally, or alternatively, client device 210 may continue execution of the model and may provide other information based on the conditional trigger-point being triggered. For example, client device 210 may provide a diagnostic environment associated with permitting continued execution of the model, providing particular information regarding the model based on the conditional trigger-point being triggered, or the like.

In some implementations, client device 210 may facilitate alteration of the model via the diagnostic environment, which may be activated based on the conditional trigger-point being triggered. For example, client device 210 may facilitate alteration of a model element, such as a core model element, a diagnostic model element, or the like, as described herein with regard to FIG. 6C. Additionally, or alternatively, client device 210 may provide an option to revert to another state of execution of the model. For example, during execution, client device 210 may store a set of states of the model (e.g., a set of values for a set of model elements at a set of times), may recall a particular state of the model (e.g., an initial state, a state prior to the conditional trigger-point being triggered, or the like), may set a state for a model element (e.g., alter a value associated with a model element, alter a value associated with a linkage, alter an evaluation of a conditional statement, etc.), or the like.

In some implementations, client device 210 may provide an option to resume execution. For example, when client device 210 pauses execution based on the conditional trigger-point being triggered, client device 210 may receive a user indication that execution is to recommence. In some implementations, client device 210 may resume execution at the time-step at which the conditional trigger-point was triggered with alterations of the model performed during a diagnostic mode, without alterations of the model performed during the diagnostic model, or the like. Additionally, or alternatively, client device 210 may resume execution at another time-step, such as a time-step prior to the conditional trigger-point being triggered, a time-step subsequent to the conditional trigger-point being triggered, or the like, based on information provided by the user while utilizing the diagnostic mode.

In some implementations, client device 210 may facilitate storing the model when providing the diagnostic environment. For example, client device 210 may store the model, the conditional trigger-point, one or more alterations to the model performed in the diagnostic environment, or the like. In some implementations, client device 210 may omit the conditional trigger-point when storing the model. For example, client device 210 may store core model elements and omit diagnostic model elements. Additionally, or alternatively, client device 210 may facilitate sharing the model when providing the diagnostic model environment. For example, client device 210 may share, with another client device 210, the model, the conditional trigger-point, the one or more alterations to the model, the core model elements, the diagnostic model elements, or the like. In some implementations, client device 210 may omit the diagnostic model elements when sharing the model.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In this way, a client device may determine a set of model elements that are to be obscured until a particular condition of the model is satisfied and may cause the set of model elements to be displayed based on the particular condition of the model being satisfied. Moreover, the client device may facilitate alteration of the model based on the particular condition being satisfied.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

The term program code is to be broadly interpreted to include text-based code that may be automatically executed (e.g., C code, C++ code, Hardware Description Language (HDL) code, very-high-speed integrated circuits (VHSIC) HDL (VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables. In one example, program code may include different combinations of the aboveidentified classes (e.g., text-based code, binary code, text files, etc.). Alternatively, or additionally, program code may be of any type, such as function, script, object, etc., and a portion of program code may include one or more characters, lines, etc. of the program code.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors, cause the one or more processors to:
execute a model that includes a first set of model elements being displayed via a user interface;
determine, during the executing of the model, that a conditional trigger-point, of the model, is triggered, the conditional trigger-point including a set of parameters associated with describing the conditional trigger-point,
the set of parameters associated with describing the conditional trigger-point including a condition for triggering the conditional trigger-point;
identify, based on information stored regarding the conditional trigger-point and based on determining that the conditional trigger-point is triggered, a second set of model elements that are associated with the condition for triggering the conditional trigger-point and are currently being obscured from display via the user interface,
the information stored regarding the conditional trigger-point being determined by a device based on information regarding the second set of model elements;
provide, for display, the second set of model elements via the user interface without obscuring the second set of model elements;
enter a diagnostic mode after the conditional trigger-point has been triggered, where the diagnostic mode enables at least one of the first set of model elements to be altered in an altered state of the model that includes the second set of model elements and any alterations to the first set of model elements;
in association with the diagnostic mode being exited, determine whether the model is to be in a state at or prior to the conditional trigger-point being triggered, or is to be in the altered state of the model; and
provide, for display and via the user interface, the model without the second set of model elements and execute the model from the state at or prior to the conditional trigger-point being triggered or execute the model from the altered state of the model.

2. The computer-readable medium of claim 1, where the one or more instructions, when executed by the one or more processors, further cause the one or more processors to:
remove one or more model elements, of the first set of model elements, from display via the user interface based on determining that the conditional trigger-point is triggered.

3. The computer-readable medium of claim 1, where the one or more instructions, when executed by the one or more processors, further cause the one or more processors to:
execute the second set of model elements based on determining that the conditional trigger-point is triggered.

4. The computer-readable medium of claim 1, where the one or more instructions, when executed by the one or more processors, further cause the one or more processors to:
receive an indication of a location of the model at which to establish the conditional trigger-point; and
establish the conditional trigger-point at the location.

5. The computer-readable medium of claim 1, where the one or more instructions, that cause the one or more processors to determine that the conditional trigger-point is triggered, cause the one or more processors to:
determine that the condition for triggering the conditional trigger-point has been satisfied based on at least one of:

a value associated with a model element of the model being reached;
a period of time elapsing;
a user action;
a quantity of a system resource being utilized;
a quantity of program code being executed;
an error being detected; or
a warning being detected.

6. The computer-readable medium of claim 1, where the one or more instructions, when executed by the one or more processors, further cause the one or more processors to:
obscure one or more model elements, of the first set of model elements, based on determining that the conditional trigger-point is triggered,
the conditional trigger-point being associated with a parameter identifying the one or more model elements.

7. The computer-readable medium of claim 1, where the one or more instructions, when executed by the one or more processors, further cause the one or more processors to:
determine, based on the set of parameters associated with describing the conditional trigger-point, diagnostic information associated with the model; and
provide the diagnostic information associated with the model based on determining that the conditional trigger-point is triggered.

8. A method, comprising:
execute a model,
the model including a set of core model elements and a set of diagnostic model elements,
the set of diagnostic model elements being associated with a conditional trigger-point,
the conditional trigger-point being associated with a condition of the model for triggering the conditional trigger-point, and
the executing the model being performed by a device;
determining, during the executing of the model, that the conditional trigger-point is triggered,
the determining that the conditional trigger-point is triggered being performed by the device;
identifying, based on information stored regarding the conditional trigger-point and based on determining that the conditional trigger-point is triggered, the set of diagnostic model elements,
the information stored regarding the conditional trigger-point being determined by a particular device based on information regarding the set of diagnostic model elements, and
the identifying the set of diagnostic model elements being performed by the device;
providing, for display, the set of diagnostic model elements via a user interface based on determining that the condition of the model has been satisfied,
the set of diagnostic model elements not being displayed, during the executing of the model, prior to determining that the condition of the model has been satisfied, and
the providing the set of diagnostic model elements via the user interface being performed by the device;
entering a diagnostic mode after the conditional trigger-point has been triggered, where the diagnostic mode enables the set of core model elements to be altered in an altered state of the model that includes the set of diagnostic model elements and any alterations to the set of core model elements;
in association with the diagnostic mode being exited, determining whether the model is to be in a state at or prior to the conditional trigger-point being triggered, or is to be in the altered state of the model; and
providing, for display and via the user interface, the model without the set of diagnostic model elements and executing the model from the state at or prior to the conditional trigger-point being triggered or executing the model from the altered state of the model.

9. The method of claim 8, further comprising:
causing the set of core model elements to be obscured from display via the user interface based on determining that the conditional trigger-point is triggered.

10. The method of claim 8, further comprising:
providing information associated with the model based on the executing of the model.

11. The method of claim 8, further comprising:
monitoring the executing of the model;
determining one or more core model elements, of the set of core model elements, and one or more diagnostic model elements, of the set of diagnostic model elements, that have been executed during the executing of the model; and
providing information identifying the one or more core model elements and the one or more diagnostic model elements based on determining that the conditional trigger-point is triggered.

12. The method of claim 8, further comprising:
receiving, after providing the set of diagnostic model elements for display, a user indication that the conditional trigger-point is to be removed; and
removing the conditional trigger-point based on receiving the user indication.

13. The method of claim 8, further comprising:
generating program code associated with the model,
the program code including first program code associated with the set of core model elements, and
the program code not including second program code associated with the set of diagnostic model elements.

14. The method of claim 8, further comprising:
storing information identifying the state at or prior to the conditional trigger-point being triggered; and
receiving an indication that the model is to be in the state at or prior to the conditional trigger-point being triggered,
the executing the model from the state at or prior to the conditional trigger-point being triggered being based on receiving the indication.

15. The method of claim 8, further comprising:
storing information associated with the model;
determining one or more model alterations performed after the condition for triggering the conditional trigger-point has been satisfied;
storing an association between the conditional trigger-point and the one or more model alterations;
selectively providing the information associated with the model; and
selectively providing the information associated with the conditional trigger-point and the one or more model alterations.

16. The method of claim 8, further comprising:
adding the conditional trigger-point to the model,
the conditional trigger-point being copied from another location;
configuring a set of parameters associated with the conditional trigger-point; and
where providing the set of diagnostic model elements comprises:

causing the set of diagnostic model elements to be displayed based on the set of parameters associated with the conditional trigger-point.

17. A device, comprising:
one or more processors to:
   execute a model that includes a set of model elements and a conditional trigger-point,
      the conditional trigger-point being associated with a condition;
   determine that the conditional trigger-point is triggered;
   identify, based on information stored regarding the conditional trigger-point and based on determining that the conditional trigger-point is triggered, one or more model elements, of the set of model elements, that are associated with the condition and are currently being obscured from display via a user interface,
      the information stored regarding the conditional trigger-point being determined by a device based on information regarding the one or more model elements of the set of model elements;
   provide, for display, the one or more model elements, of the set of model elements, without obscuring the one or more model elements of the set of model elements;
   enter a diagnostic mode after the conditional trigger-point has been triggered, where the diagnostic mode enables the set of model elements to be altered in an altered state of the model that includes the provided one or more model elements and any alterations to the set of model elements;
   in association with the diagnostic mode being exited, determining whether the model is to be in a state at or prior to the conditional trigger-point being triggered, or is to be in the altered state of the model; and
   provide, for display and via the user interface, the model without the one or more model elements, of the set of model elements, and execute the model from the state at or prior to the conditional trigger-point being triggered or execute the model from the altered state of the model.

18. The device of claim 17, where the one or more processors are further to:
   obscure one or more other elements, of the set of model elements, that are not associated with the conditional trigger-point.

19. The device of claim 17, where the one or more processors, are further to:
   provide a diagnostic environment based on determining that the conditional trigger-point is triggered,
      the diagnostic environment facilitating at least one of:
         setting a value associated with a model element of the set of model elements;
         adding a model element to the set of model elements;
         removing a model element from the set of model elements;
         altering the conditional trigger-point; or
         displaying diagnostic information regarding the model.

20. The device of claim 17,
where the one or more processors are further to:
   determine another condition for the conditional trigger-point,
      the other condition being different from the condition; and
   determine that the other condition associated with the conditional trigger-point has been satisfied based on executing the model; and
where the one or more processors are further to:
   alter the user interface based on determining that the other condition associated with the conditional trigger-point has been satisfied.

21. The computer-readable medium of claim 1, where the determining in association with the diagnostic model being exited comprises receiving a user interaction associated with an element displayed in the diagnostic mode.

22. The method of claim 8, where the determining in association with the diagnostic model being exited comprises receiving a user interaction associated with an element displayed in the diagnostic mode.

23. The device of claim 17, where the determining in association with the diagnostic model being exited comprises receiving a user interaction associated with an element displayed in the diagnostic mode.

* * * * *